United States Patent
Kamen et al.

(10) Patent No.: US 6,966,182 B2
(45) Date of Patent: *Nov. 22, 2005

(54) STIRLING ENGINE THERMAL SYSTEM IMPROVEMENTS

(75) Inventors: Dean L. Kamen, Bedford, NH (US); Thomas Q. Gurski, Goffstown, NH (US); Christopher C. Langenfeld, Nashua, NH (US); Ryan Keith LaRocque, Pepperell, MA (US); Michael Norris, Manchester, NH (US); Kingston Owens, Bedford, NH (US); Jonathan Strimling, Bedford, NH (US)

(73) Assignee: New Power Conceps LLC, Manchester, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/753,918

(22) Filed: Jan. 7, 2004

(65) Prior Publication Data

US 2004/0144089 A1 Jul. 29, 2004

Related U.S. Application Data

(60) Division of application No. 09/884,436, filed on Jun. 19, 2001, now Pat. No. 6,694,731, which is a continuation-in-part of application No. 09/517,245, filed on Mar. 2, 2000, now Pat. No. 6,381,958, which is a continuation-in-part of application No. 09/115,383, filed on Jul. 14, 1998, now Pat. No. 6,062,023, which is a continuation-in-part of application No. 09/115,381, filed on Jul. 14, 1998, now abandoned.

(60) Provisional application No. 60/052,535, filed on Jul. 15, 1997.

(51) Int. Cl.$^7$ ............................................. F01B 29/10
(52) U.S. Cl. ........................................... 60/524; 60/517
(58) Field of Search ........................... 60/517, 520, 523, 60/524, 526

(56) References Cited

U.S. PATENT DOCUMENTS

| 646,406 | A | | 4/1900 | Anderson et al. |
| 2,585,457 | A | | 5/1952 | Holm et al. |
| 2,688,228 | A | | 9/1954 | De Brey et al. |
| 4,069,670 | A | * | 1/1978 | Bratt et al. .................. 60/517 |
| 4,387,568 | A | | 6/1983 | Dineen |
| 4,527,394 | A | | 7/1985 | Corey |
| 5,743,091 | A | | 4/1998 | Penswick et al. |
| 5,878,570 | A | | 3/1999 | Reithofer |
| 6,062,023 | A | | 5/2000 | Kerwin et al. |
| 6,161,381 | A | | 12/2000 | Lohrmann |
| 6,293,101 | B1 | | 9/2001 | Conrad |
| 6,381,958 | B1 | * | 5/2002 | Kamen et al. ................ 60/517 |

FOREIGN PATENT DOCUMENTS

| DE | 8411960 | 4/1984 |
| DE | 3734009 | 10/1987 |
| DE | 4219583 | 6/1992 |

(Continued)

Primary Examiner—Hoang Nguyen
(74) Attorney, Agent, or Firm—Bromberg & Sunstein LLP

(57) ABSTRACT

A thermal cycle engine having a heat exchanger for transferring thermal energy across the heater head from a heated external fluid to the working fluid. The heat exchanger has a set of heat transfer pins each having an axis directed away from the cylindrical wall of the expansion cylinder. The height and density of the heat transfer pins may vary with distance in the direction of the flow path, and the pin structure may be fabricated by stacking perforated rings in contact with a heater head. Ribs are provided interior to the heater head to enhance hoop strength and thermal transfer.

7 Claims, 20 Drawing Sheets

FOREIGN PATENT DOCUMENTS

| | | |
|---|---|---|
| FR | 1063612 | 9/1952 |
| GB | 306274 | 2/1929 |
| GB | 395374 | 7/1933 |
| GB | 422823 | 1/1935 |
| GB | 689484 | 8/1950 |
| GB | 917278 | 1/1963 |
| IT | 500313 | 5/1953 |
| JP | 55 037540 | 3/1980 |
| JP | 58 25556 | 8/1981 |
| JP | 56 133597 | 10/1981 |

* cited by examiner

READY FOR START OF COMPRESSION STROKE

END OF COMPRESSION STROKE

READY FOR START OF EXPANSION STROKE

END OF EXPANSION STROKE

STIRLING ENGINE THERMAL SYSTEM IMPROVEMENTS

The present application is a divisional application of U.S. application Ser. No. 09/884,436, now U.S. Pat. No. 6,694,731 filed Jun. 19, 2001, itself a continuation-in-part of U.S. application Ser. No. 09/517,245, now U.S. Pat. No. 6,381,958 filed Mar. 2, 2000, itself a continuation-in-part application of U.S. application Ser. No. 09/115,383, filed Jul. 14, 1998, and issued May 16, 2000 as U.S. Pat. No. 6,062,023, and a continuation-in-part also of Ser. No. 09/115,381, filed Jul. 14, 1998 and now abandoned, claiming priority from U.S. provisional application No. 60/052,535, filed Jul. 15, 1997, all of which applications are herein incorporated by reference.

TECHNICAL FIELD

The present invention pertains to improvements to thermal components of a Stirling cycle heat engine and more particularly to heat transfer surfaces such as the heater head.

BACKGROUND OF THE INVENTION

Stirling cycle machines, including engines and refrigerators, have a long technological heritage, described in detail in Walker, *Stirling Engines*, Oxford University Press (1980), incorporated herein by reference. The principle underlying the Stirling cycle engine is the mechanical realization of the Stirling thermodynamic cycle: isovolumetric heating of a gas within a cylinder, isothermal expansion of the gas (during which work is performed by driving a piston), isovolumetric cooling, and isothermal compression.

Additional background regarding aspects of Stirling cycle machines and improvements thereto are discussed in Hargreaves, *The Phillips Stirling Engine* (Elsevier, Amsterdam, 1991) and in co-pending U.S. patent applications Ser. No. 09/115,383, filed Jul. 14, 1998, and Ser. No. 09/115,381, filed Jul. 14, 1998, which reference and both of which applications are herein incorporated by reference.

The principle of operation of a Stirling engine is readily described with reference to FIGS. 1a–1e, wherein identical numerals are used to identify the same or similar parts. Many mechanical layouts of Stirling cycle machines are known in the art, and the particular Stirling engine designated generally by numeral 10 is shown merely for illustrative purposes. In FIGS. 1a to 1d, piston 12 and a displacer 14 move in phased reciprocating motion within cylinders 16 which, in some embodiments of the Stirling engine, may be a single cylinder. A working fluid contained within cylinders 16 is constrained by seals from escaping around piston 12 and displacer 14. The working fluid is chosen for its thermodynamic properties, as discussed in the description below, and is typically helium at a pressure of several atmospheres. The position of displacer 14 governs whether the working fluid is in contact with hot interface 18 or cold interface 20, corresponding, respectively, to the interfaces at which heat is supplied to and extracted from the working fluid. The supply and extraction of heat is discussed in further detail below. The volume of working fluid governed by the position of the piston 12 is referred to as compression space 22.

During the first phase of the engine cycle, the starting condition of which is depicted in FIG. 1a, piston 12 compresses the fluid in compression space 22. The compression occurs at a substantially constant temperature because heat is extracted from the fluid to the ambient environment. The condition of engine 10 after compression is depicted in FIG. 1b. During the second phase of the cycle, displacer 14 moves in the direction of cold interface 20, with the working fluid displaced from the region of cold interface 20 to the region of hot interface 18. This phase may be referred to as the transfer phase. At the end of the transfer phase, the fluid is at a higher pressure since the working fluid has been heated at constant volume. The increased pressure is depicted symbolically in FIG. 1c by the reading of pressure gauge 24.

During the third phase (the expansion stroke) of the engine cycle, the volume of compression space 22 increases as heat is drawn in from outside engine 10, thereby converting heat to work. In practice, heat is provided to the fluid by means of a heater head 100 (shown in FIG. 2) that is discussed in greater detail in the description below. At the end of the expansion phase, compression space 22 is full of cold fluid, as depicted in FIG. 1d. During the fourth phase of the engine cycle, fluid is transferred from the region of hot interface 18 to the region of cold interface 20 by motion of displacer 14 in the opposing sense. At the end of this second transfer phase, the fluid fills compression space 22 and cold interface 20, as depicted in FIG. 1a, and is ready for a repetition of the compression phase. The Stirling cycle is depicted in a P-V (pressure-volume) diagram as shown in FIG. 1e.

Additionally, on passing from the region of hot interface 18 to the region of cold interface 20, the fluid may pass through a regenerator 134 (shown in FIG. 2). Regenerator 134 is a matrix of material having a large ratio of surface area to volume which serves to absorb heat from the fluid when it enters hot from the region of hot interface 18 and to heat the fluid when it passes from the region of cold interface 20.

Stirling cycle engines have not generally been used in practical applications due to such practical considerations as efficiency, lifetime, and cost which are addressed by the instant invention.

SUMMARY OF THE INVENTION

In accordance with preferred embodiments of the present invention, there is provided a method for fabricating heat transfer protuberances, such as for the heater head or cooler of a thermal cycle engine, wherein the heat transfer protuberances conduct heat between an external fluid and a working gas through a cylindrical wall where the working gas is interior to the wall. The method includes casting of the cylindrical wall and the heat transfer protuberances in a single operation. The casting step may include investment casting, sand casting, or die casting. The method may also include steps of fabricating a plurality of negative molds, each mold being of a group of substantially parallel holes corresponding to the heat transfer protuberances in the fabricated part. The plurality of negative molds is assembled to form a negative form for casting the cylindrical wall and heat transfer protuberances.

In accordance with further embodiments of the invention, a method is provided for fabricating heat transfer pins for conducting heat from an external thermal source through a cylindrical wall where the method has the steps of integrally fabricating at least one backing panel and heat transfer pins having axes normal to the backing panel, and then bonding the at least one backing panel to a structure in thermal contact with the cylindrical wall. The step of integrally fabricating the at least one backing panel may include either casting or injection molding the backing panel. The step of bonding may include mechanically attaching the panel to the heater head, brazing the panel of the array of heat transfer pins to the heater head, or transient liquid-phase bonding of the panel of the array of heat transfer pins to the heater head. In accordance with yet further embodiments of the invention, a method is provided for enhancing efficiency of thermal transfer through a heater head to a working gas in a thermal cycle engine, the heater head having an interior surface. The method includes the step of applying a layer of high-thermal-conductivity metal to the at least one of the interior and exterior surfaces of the heater head.

An alternate embodiment of the invention provides an improvement to a heater head for a thermal cycle heat engine that has a substantially cylindrical wall section. The improvement has a plurality of ribs interior to the wall section for providing enhanced hoop strength. Other improvements to a heater head, in accordance with the invention, include a plurality of passages within the wall that extend parallel to a central longitudinal axis and a substantially helical channel within the cylindrical wall section. An additional improvement includes a plurality of ribs interior to the dome for providing enhanced dome strength. A plurality of flow diverters may also be provided, extending transversely from a hot sleeve disposed internally to, and concentrically with, the cylindrical wall section.

In accordance with a further aspect of the present invention, a heat exchanger is provided for transferring thermal energy from a heated external fluid across a cylindrical wall. The heat exchanger has a set of staggered heat transfer protuberances, each heat transfer protuberance having an axis directed substantially away from the cylindrical wall, and a plurality of dividers disposed substantially along the length of the cylindrical wall, for forcing fluid flow through the staggered heat transfer protuberances.

In accordance with yet a further aspects of the present invention, a heat exchanger is provided for transferring thermal energy from a heated external fluid across a cylindrical wall, where the heat exchanger has a set of heat transfer protuberances with axes directed substantially away from the cylindrical wall, and a backer for guiding the heated external fluid in a flow path characterized by a direction substantially along the length of the cylindrical wall past the set of heat transfer protuberances. A gap between the backer and the cylindrical wall may decrease in the direction of the flow path of the external fluid. In other embodiments of the invention, the heat transfer protuberances have a surface area transverse to the flow path that increases in the direction of the flow path. In other embodiments of the invention, the heat transfer pins may have a population density that increases in the direction of the flow path. In yet other embodiments of the invention, at least one of the height and density of the heat transfer pins may vary with distance in the direction of the flow path.

BRIEF DESCRIPTION OF THE DRAWINGS

The invention will be more readily understood by reference to the following description, taken with the accompanying drawings, in which:

FIGS. 6b–6d plot the rate of heat transfer, heat transfer coefficient, and gas temperature, respectively, as a function of distance from the top of the heat exchanger of FIG. 6a;

DETAILED DESCRIPTION OF PREFERRED EMBODIMENTS

Figure 1A:
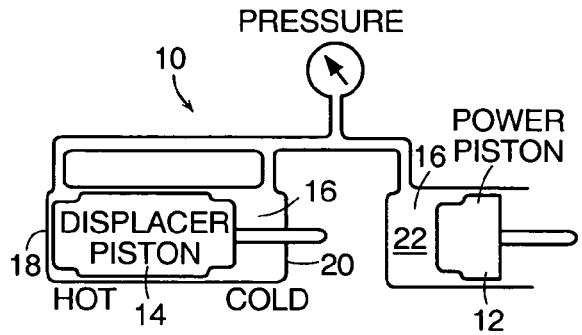
FIGS. 1a–1e depict the principle of operation of a prior art Stirling cycle machine.
Figure 1B:
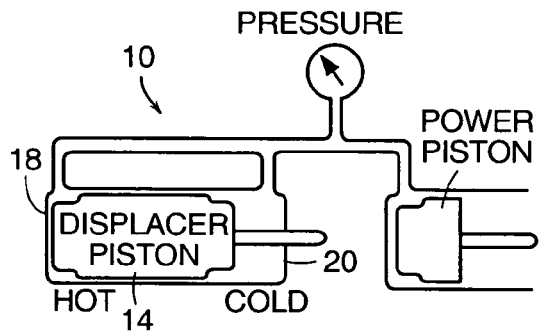
Figure 1C:
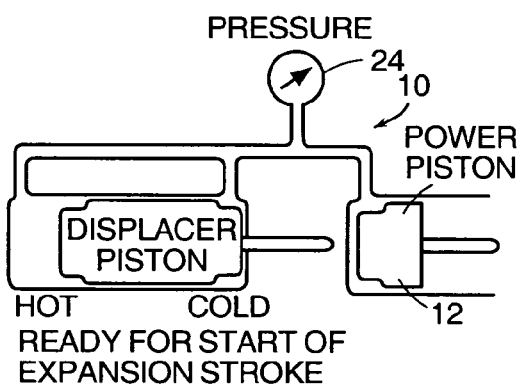
Figure 1D:
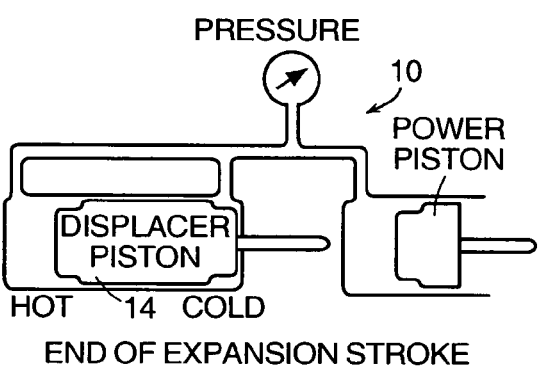
Figure 1E:
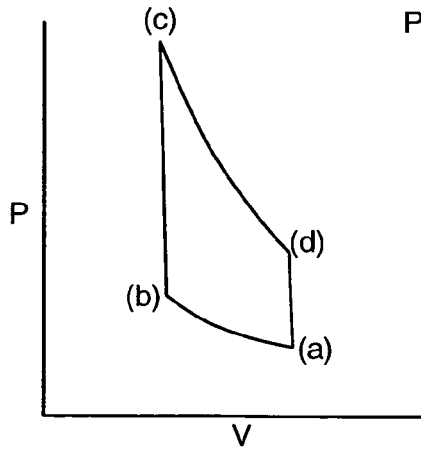
Figure 2:
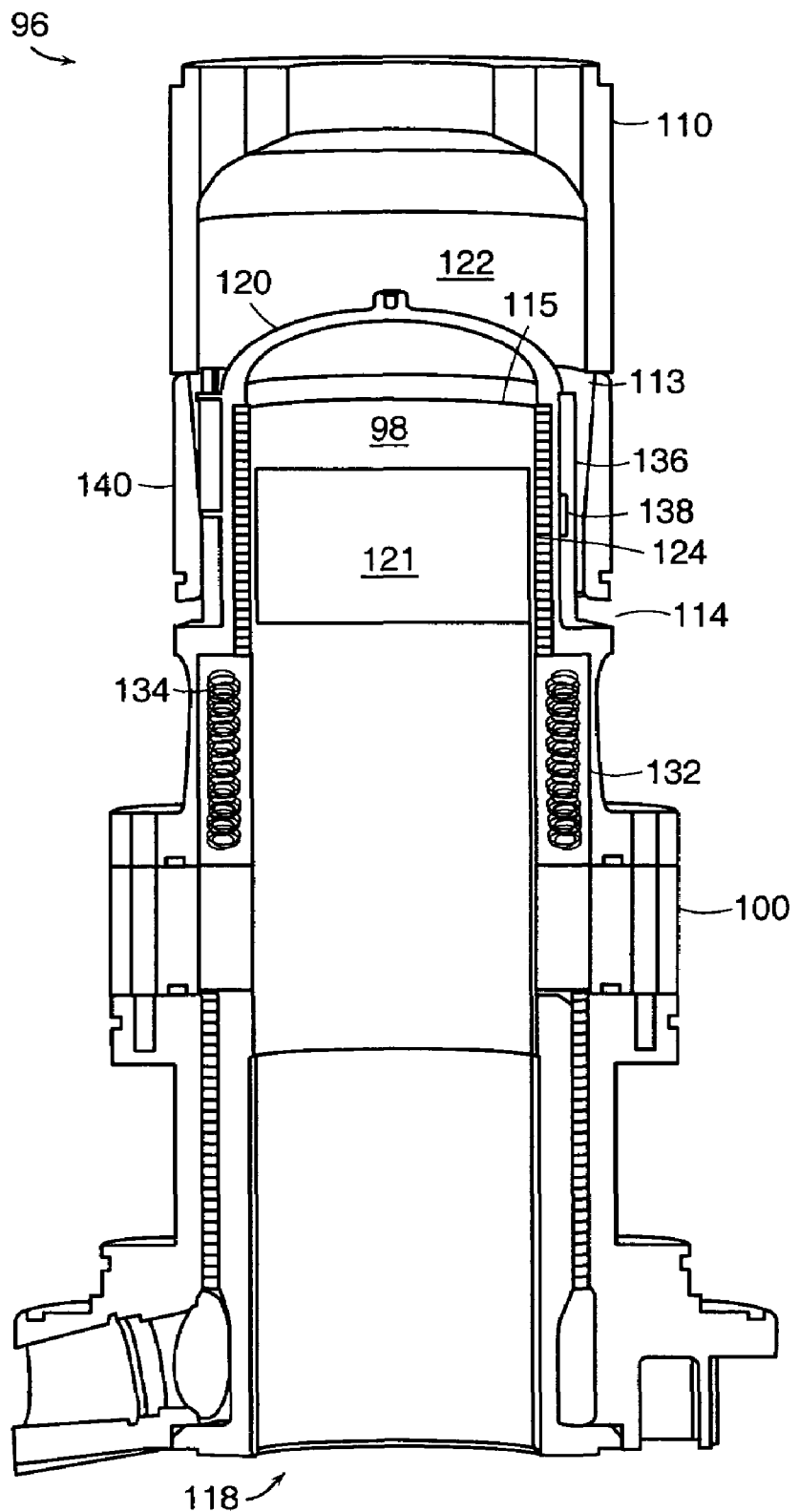
FIG. 2 shows a side view in cross section of the heater head and combustion chamber of a thermal engine in accordance with a preferred embodiment of the present invention.

Referring to FIG. 2, a cross-sectional view is shown of the expansion volume 98 of a thermal cycle engine, shown for illustrative purposes as a Stirling cycle engine designated generally by numeral 96, and of the corresponding thermal control structures. Heater head 100 is substantially a cylinder having one closed end 120 (otherwise referred to as the cylinder head) and an open end 118. Closed end 120 is disposed in a combustion chamber 122 defined by an inner combustor structure 110. Hot combustion gases in combustion chamber 122 are in direct thermal contact with heater head 100 and thermal energy is transferred by conduction from the combustion gases to the heater head and from the heater head to the working fluid of the thermal engine, typically helium. Other gases such as nitrogen, for example, or mixtures of gases, may be used within the scope of the present invention, with a preferable working fluid having high thermal conductivity and low viscosity. Non-combustible gases are also preferred. Heat is transferred from the combustion gases to the heater head as the combustion gases flow along the outside surface of closed end 120 within a gas flow channel 113.

Expansion volume 98 is surrounded on its sides by expansion cylinder liner 115, disposed, in turn, inside heater head 100 and typically supported by the heater head. The expansion piston 121 travels along the interior of expansion cylinder liner 115. As the expansion piston travels toward closed end 120 of heater head 100, the working fluid within the heater head is displaced and caused to flow through flow channels defined by the outer surface of the expansion cylinder liner 115 and the inner surface of heater head 100.

The overall efficiency of a thermal engine is dependent in part on the efficiency of heat transfer between the combustion gases and the working fluid of the engine. One method known in the art for transferring heat efficiently from the combustion gases in combustion chamber 122 to the working fluid in expansion volume 98 requires a plurality of heating loops (not shown in FIG. 2, as they form no part of the specific embodiment shown there) that extend beyond the heater head and into the combustion chamber.

Figure 3:
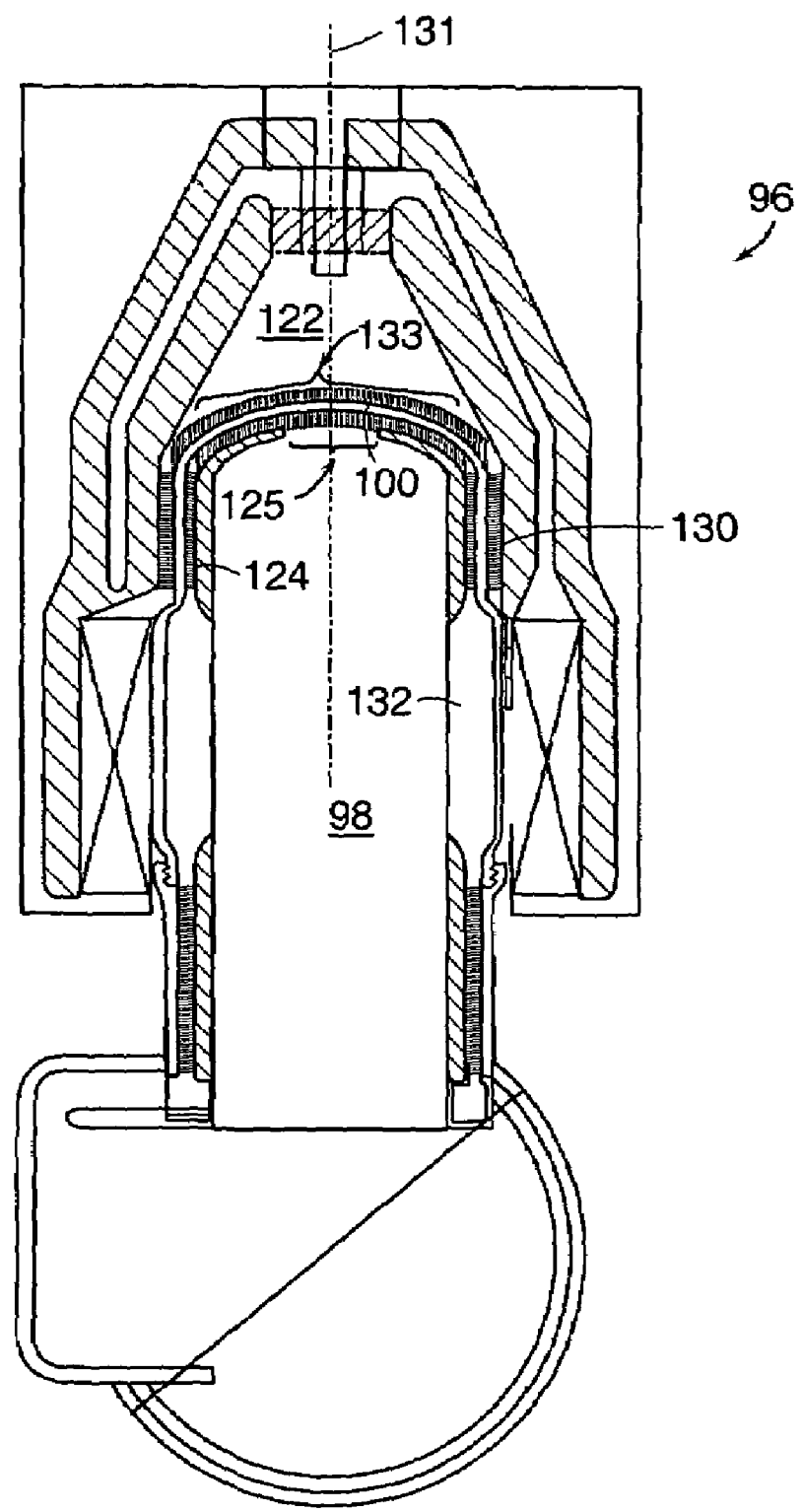
FIG. 3 shows a further cross section of the heater head and combustion chamber of FIG. 2 along a direction in which both interior-facing and exterior-facing thermal pins are evident, and includes heat transfer pins lining the interior and exterior surfaces of the top of heater head, in accordance with an alternate embodiment of the invention.

In accordance with embodiments of the present invention, protuberances, such as fins or pins, may be used to increase the interfacial area between the hot fluid combustion products and the solid heater head so as to transfer heat, in turn, to the working fluid of the engine. Heater head 100 may have heat transfer pins 124, here shown on the interior surface of heater head 100, in the space between the heater head and expansion cylinder liner 115. Additionally, as shown in FIG. 3 in a cross section of Stirling cycle engine 96 taken along a different diameter of expansion volume 98 from that of FIG. 2, heat transfer pins 130 may also be disposed on the exterior surface of heater head 100 so as to provide a large surface area for the transfer of heat by conduction to heater head 100, and thence to the working fluid, from combustion gases flowing from combustor 122 past the heat transfer pins. Dashed line 131 represents the longitudinal axis of the expansion cylinder. FIG. 3 also shows heat transfer pins 133 lining the interior and exterior surfaces of the top of heater head 100, in accordance with an alternate embodiment of the invention. Interior-facing heat transfer pins 124 serve to provide a large surface area for the transfer of heat by conduction from heater head 100 to working fluid displaced from expansion volume 98 by the expansion piston and driven through regenerator chamber 132. Depending on the size of heater head 100, hundreds or thousands of inner heat transfer pins 124 and outer heat transfer pins 130 may be desirable.

One method for manufacturing heater head 100 with heat transfer pins 124 and 130 includes casting the heater head and pins (or other protuberances) as an integral unit. Casting methods for fabricating the heater head and pins as an integral unit include, for example, investment casting, sand casting, or die casting.

While the use of pin fins is known for improving heat transfer between a surface and a fluid, the integral casting of radial pin fins on the cylindrical heater head of a Stirling engine has not been practiced nor suggested in the art, despite the fact that casting the heater head and it's heat exchange surfaces in a single step is one of the most cost effective methods to produce a heater head. The difficulty encountered in integral casting of radial pin fins is discussed further below. A pin fin that could be cast as part of cylindrical wall would allow the inexpensive fabrication of a highly effective heater head and/or cooler for a Stirling engine.

Castings are made by creating negative forms of the desired part. All forms of production casting (sand, investment and injection) involves forming extended surfaces and details by injecting material into a mold and then removing the mold from the material leaving the desired negative or positive form behind. Removing the mold from the material requires that all the extended surfaces are at least parallel. In fact, good design practice requires slight draft on these extended surfaces so that they release cleanly. Forming radial pins on the outside or inside of a cylinder would require the molds to contain tens or hundreds of parts that pull apart in different directions. Such a mold would be cost prohibitive.

Figure 4A:
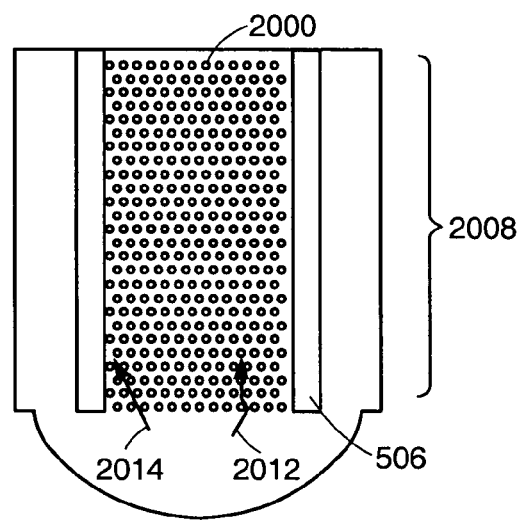
FIG. 4a is a radial view of a group of parallel pins viewed towards the central axis of a cylindrical heater head in accordance with an embodiment of the present invention.
Figure 4B:
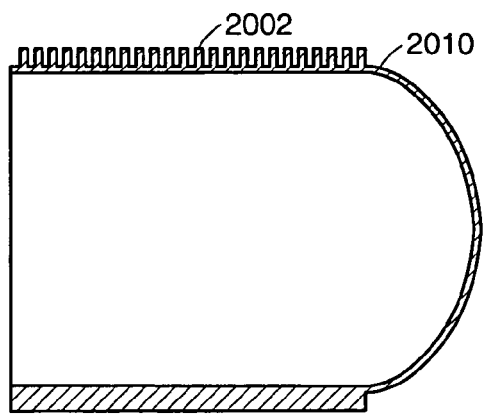
FIGS. 4b and 4c are cross sections of the heater head of FIG. 4a taken parallel and transversely, respectively, to the central axis of the heater head cylinder.
Figure 4C:
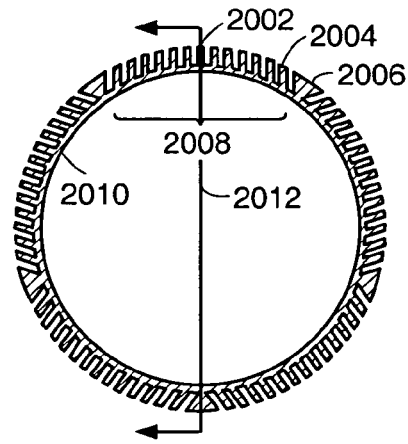
Figure 4D:
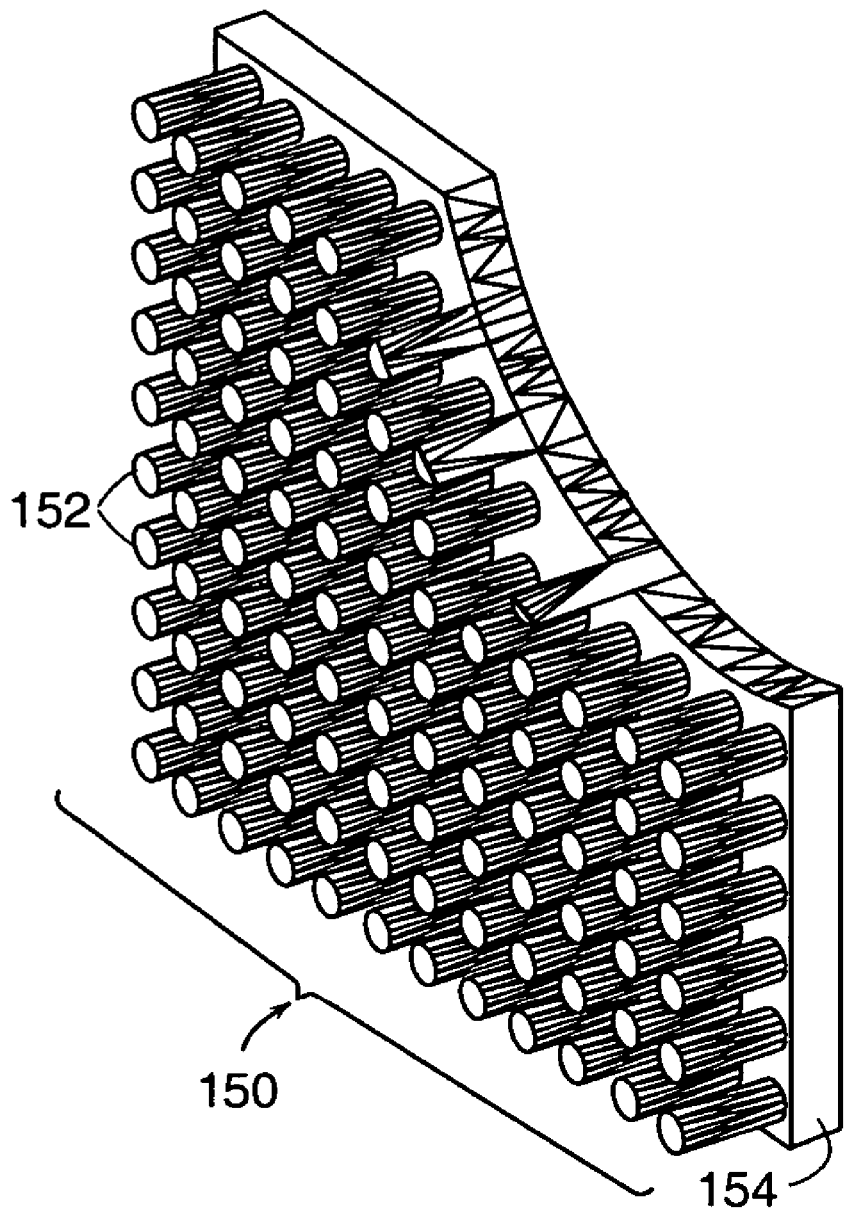
FIG. 4d is a perspective view of a heat transfer pin array separately cast for assembly to a heater head in accordance with an embodiment of the present invention.

In accordance with the present invention, pins or fins may be cast onto the inside and outside surface of Stirling heat exchangers using production sand, investment or metal injection casting methods. Referring to FIGS. 4a–4d, and, first, to FIG. 4a, pins 2002 are arranged into several groups 2008 of parallel pins 2002 around cylindrical wall 2010 of heater head 100, shown in cross section parallel to the central axis in FIG. 4b and in cross section transverse to the central axis, in FIG. 4c. It should be noted that the technology herein described may advantageously be applied more generally in any other heat exchanger application. All the pins 2002 in each group 2008 are parallel to each other. Only the pins 2002 in the center of the group are truly radial. The pins on the outside of the group, such as those designated by numeral 2004 in FIG. 4c, are angled inward from a local radius such as to be substantially parallel to a radial line 2012 toward the center of the group. In addition, the pins on the outside of the group are preferably longer, typically by a small amount, than pins closer to the center of the group. However, the heat transfer only changes only slightly from the center of the group to the outside in the embodiment depicted in FIGS. 4a–4c in which 5 groups 2008 of parallel pins provide approximately radial pin fins around cylinder 2010.

In the casting process in accordance with preferred embodiments of the invention, positive or negative molds of each group of parallel fins are formed in a single piece. Several mold pieces are then assembled to form the negative form for a sand casting. In investment mold casting, the wax positive can be formed in an injection mold with only a handful of separate parts that pull apart in different directions. The resulting mold is formed at an acceptable cost, thereby making production of a pin fin heater head economically practical.

Casting of a heater head having protuberances, such as pins, extending to the interior and exterior of a part with cylindrical walls may be achieved, in accordance with embodiments of the present invention, by investment, or lost-wax, casting, as well as by sand casting, die casting, or other casting processes. The interior or exterior protuberances, or both, may be integrally cast, in accordance with the teachings of this invention, as part of the head.

While typically more cheaply accomplished than machining or assembly of the pin arrays, casting pin arrays may still have attendant difficulties and substantial costs. Additionally, the casting process may result in a heater head that is less than fully densely populated with pins, thus increasing the fraction of gases failing to collide with the heater head surface and reducing the efficiency of heat transfer.

An alternate method for populating the surfaces of heater head 100 with heat transfer pins, in accordance with other embodiments of the invention, entails fabrication of heater 100 and arrays of heat transfer pins in separate fabrication processes. An array 150 of heat transfer pins 152 may be cast or injection molded with panel 154 resulting in an integral backing panel structure shown in FIG. 4d. Pin arrays 150, after casting or molding, are mounted to the inner and outer surfaces of the heater head by a high temperature braze. Thus, a more densely populated head with a resultant low rate of gas leakage past the pins may advantageously be achieved. In other embodiments, panels 154 may be secured by various mechanical means to the heater head.

Transient liquid-phase (TLP) bonding, as described, for example, in the *Aerospace Structural Metals Handbook*, Code 4218, p. 6 (1999) is particularly advantageous for brazing the panels to the head, since nickel based superalloys, typically employed for fabrication of the head, is difficult to weld by conventional processes, and operates in a high stress and high temperature environment. Advantages of TLP bonding in this application are that the parts braced by TLP are effectively welded using the parent material and have nearly the same tensile strength properties as integrally cast parts. TLP bonds do not remelt at elevated temperatures, whereas typical brazes will remelt at the brazing temperature. This is of particular significance in the case of continuous operation at elevated temperatures where temperature excursions may occur, as in the present application.

The panels 154 of pins may be attached to the interior or exterior of either the heater head or the cooler by other means. In one alternative embodiment, the panel may be mechanically attached into slots at its lateral edges. The slots are provided in dividers 506 (described in the following discussion). In another embodiment, the panels are attached to the heater head or cooler by brazing. In yet another embodiment, the panels are attached to the heater head or cooler by sintering the panels to the cylindrical walls of the heater head or cooler.

Figure 5A:
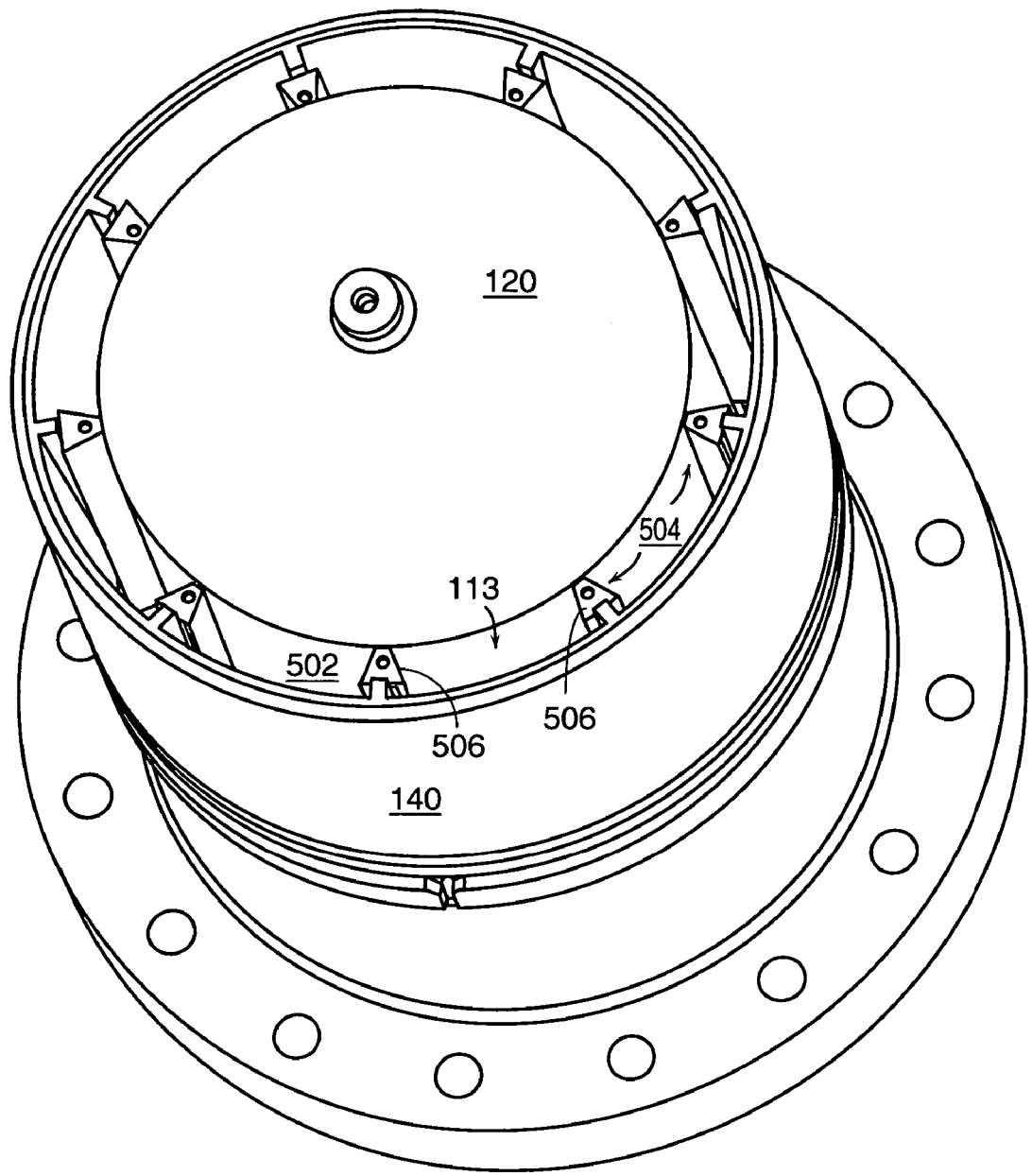
FIG. 5a shows a perspective top view of a heater head for mounting cast segments of heat transfer pin arrays such as shown in FIG. 4.
Figure 5B:
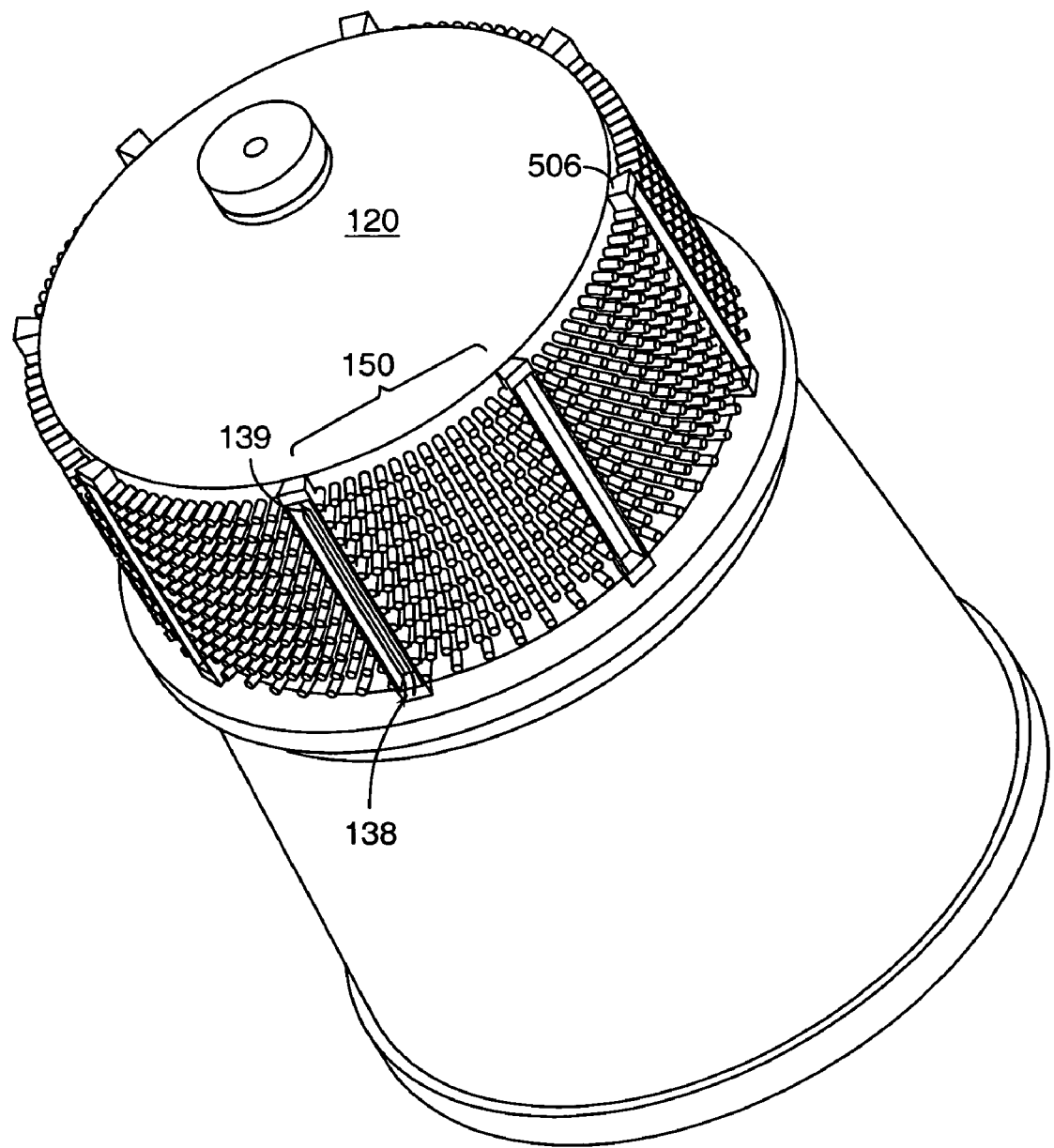
FIG. 5b shows a perspective top view of a heater head with mounted cast segments of heat transfer pin arrays, with the pin backer removed to show the heat transfer pins.

Dividers 506, as shown in FIGS. 4c, 5a, and 5b, may advantageously improve the heat transfer rate of the pin fin panels. Additionally, they may provide a convenient location for locating temperature sensors. Lastly, the dividers may advantageously provide a convenient structure to which to attach panels of pins to the heater head, in one embodiment, and a parting line for casting operations, in accordance with a further embodiment.

Dividers 566 may serve to improve the thermal effectiveness of the pin fin arrays in the following manner. Referring, once again, to FIG. 4a, the rate of heat transfer for a fluid flowing through staggered pin fins is significantly higher than for fluid flowing through aligned pin fins. Fluid approaching a staggered pin array 2008 would travel at a 45-degree angle to an axial path along the length of the cylinder, with the skew direction designated by numeral 2014. In order to provide for improved thermal transfer, dividers 506 are provided, in accordance with preferred embodiments of the invention, to force the fluid flow through the staggered array of pin fins along a path designated by numeral 2012. In addition to forcing the flow to travel axially, the dividers provide convenient interfaces and joining planes for the casting molds described above.

In certain embodiments of the invention, individual arrays 150, each with its associated panel segment 154, comprise arcuate fractions of the circumferential distance around the heater head. This is apparent in the top view of the heater head assembly shown in perspective in FIG. 5a. Cylinder head 120 is shown, as is exterior surface 502 of the heater head. Backer segments supporting arrays of heat transfer pins are not shown but are inserted, during assembly, in spaces 504 surrounding exterior surface 502 of the heater head. Between successive heat transfer pin array segments are trapezoidal dividers 506 which are baffled to block the flow of exhaust gases in a downward direction through any path other than past the heat transfer pins.

In one embodiment, flow dividers 506 include structures for mechanically retaining the panel segments 154 during assembly, before brazing, or simply to mechanically retain the panels 154 against heater head 502.

In order to maximize engine power, the hottest part of the heater head is preferably at the highest temperature allowed, considering the metallurgical creep and tensile strength, stress, and appropriate factors of safety. Maintaining the hottest part of the heater head at the highest temperature requires measuring the temperature of the hottest part of the heater head. The dividers provide a convenient location and routing for temperature sensors on the heater had to any axial location along the pin fin arrays. Hot gas flow path 113 (shown also in FIG. 2), is defined, on the outside, by gas flow channel cover 140. Since exhaust gases do not flow through dividers 506, a temperature sensor, such as thermocouple 138 (shown in FIGS. 2 and 5c) is advantageously disposed in divider 506 in order to monitor the temperature of heater head 100 with which the temperature sensor is in thermal contact. The position of pin arrays 150 and temperature sensor 138 mounted within divider 506 is shown more clearly in the view of FIG. 5b in which the pin backer has been removed.

Figure 5C:
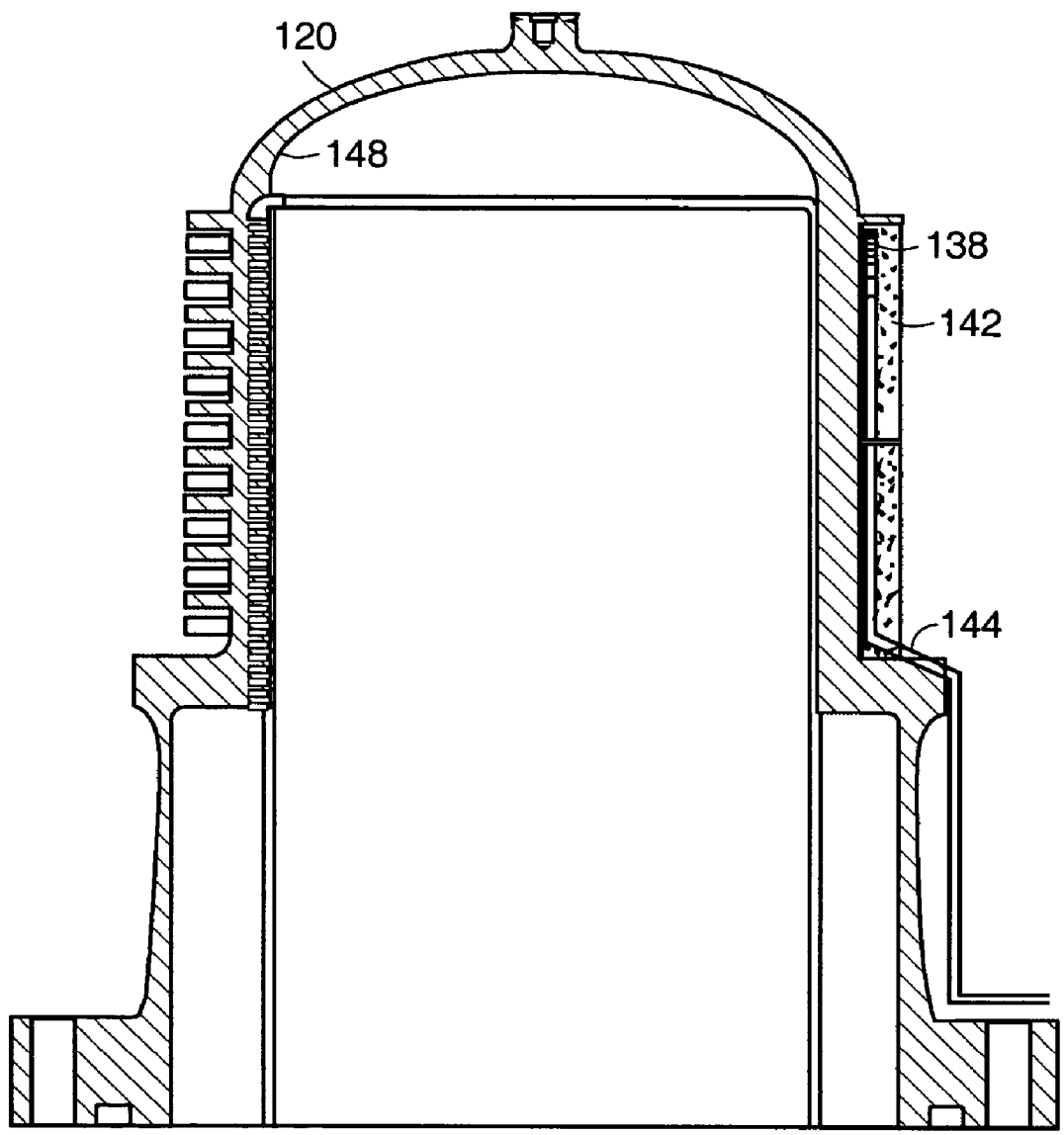
FIG. 5c is a cross sectional side view of the heater head assembly of FIG. 3 showing the placement of ceramic insulation between the heater head temperature sensors and the exhaust gas, in accordance with an embodiment of the invention.

Temperature sensing device 138 is preferably disposed within divider 506 as depicted in FIG. 5b. More particularly, temperature sensing tip 139 of temperature sensor 138 is preferably located in the slot corresponding to divider 506 as nearly as possible to cylinder head 120 in that this area is typically the hottest part of the heater head. Alternatively, temperature sensor 138 might be mounted directly to cylinder head 120, however location of the sensor in the slot, as described, is preferred. Engine performance, in terms of both power and efficiency, is highest at the highest possible temperature, yet the maximum temperature is typically limited by metallurgical properties. Therefore, sensor 138 should be placed to measure the temperature of the hottest, and therefore the limiting, part of the heater head. Additionally, temperature sensor 138 should be insulated from combustion gases and walls of divider 506. One embodiment provides ceramic insulation 142 between the temperature sensor and the combustion gases and divider walls, as shown in FIG. 5c. The ceramic can also form an adhesive bond with the walls of the divider to retain the temperature sensor in place. Electrical leads 144 of temperature sensor 138 should also be electrically insulated.

The power of the engine is limited, among various factors, by the thermal efficiency of the heater head. This thermal efficiency depends, in turn, on the fin efficiency of the pin fins. Requirements of high creep strength and oxidation resistance at very high operating temperature make the use of high nickel alloys preferable. The efficiency of the interior fins may be advantageously increased by applying a layer of highly thermally conductive metal, such as nickel or copper, of thickness greater than 0.001 in. and preferably about 0.005 in., to interior surface 148 of heater head 120, by deposition or plating, or other application method. Alternatively, a similar coating may be applied to the exterior surface, in accordance with another embodiment of the invention.

Figure 6B:
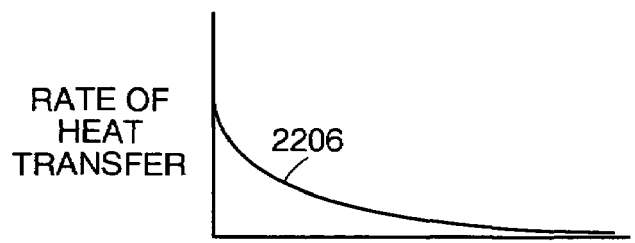
Figure 6C:
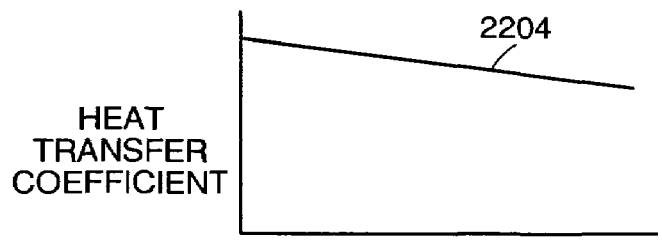
Figure 6D:
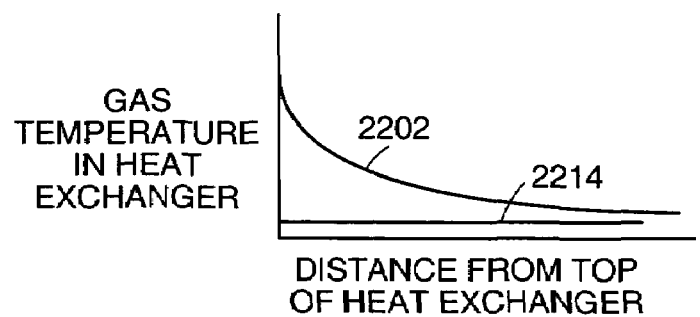
Figure 6A:
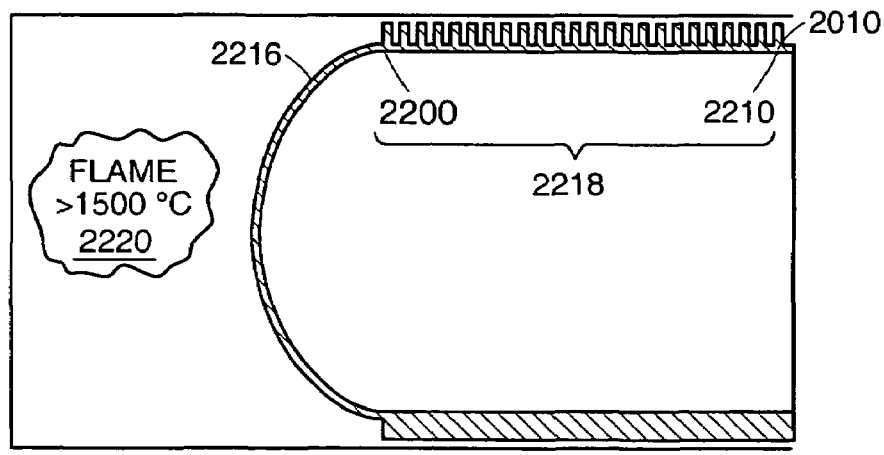
FIG. 6a is a cross sectional side view of a heater head assembly with external heat transfer pin fins shown as well as a pin backer parallel to the wall of the heater head cylinder.

In order to keep the size of a Stirling cycle engine small, the heat flux from the combustion gas through the heater head is preferably maximized. Referring now to FIG. 6a, heat transfer into the Stirling heater head and therefore the Stirling engine power is limited by the maximum temperature of the heater head, as discussed above. In order to maximize power, the heater head is preferably fabricated from the family of high nickel alloys, commonly known as super alloys, such as Iconel 600 (having a maximum temperature $T_{max}$=800° C. before softening, Iconel 625 ($T_{Max}$=900° C.), Iconel 754 ($T_{max}$=10800° C.), or Hastelloy GMR 235 ($T_{max}$=935° C.). A heater head dome 2216 with the heat exchange surface located on the cylindrical wall 2010 is limited by the temperature at the top 2200 of heat exchanger area 2218. Here the gas temperatures are the highest (typically greater than 1500° C.), as governed by the temperature of flame 2220 and the rate of heat transfer from the hot combustion gases on the outside and cooling from the working gas on the inside. The rate of heat transfer, shown as a function of distance from the top 2200 of the heat exchanger in FIG. 6b, is a function of the burner power and air flow. The burner power and therefore the engine power may be increased if the heat transfer between the combustion gases and the heater head is reduced at the place where the gases are the hottest.

At the same time as the top 2200 of the heat exchange surface is getting too hot, the amount of heat transfer at the bottom 2210 of the heat exchanger 2218 is too low. The gas cools rapidly as it gives up thermal energy to the heater head, as plotted in FIG. 6d as a function of distance from the top of the heat exchanger, so that by the time the gas exits the heat exchanger the gas temperature 2202 is near the head temperature 2214 and the rate of heat transfer 2206 is nearing zero.

The most efficient heat exchanger would have high heat transfer over its entire surface. This would maximize the amount of heat transferred to the head for given maximum head temperature. The problem is that heat transfer coefficient 2204, plotted in FIG. 6c as a function of distance from the top of the heat exchanger, is fairly constant, while the gas temperature 2204 is dropping rapidly.

Figure 6F:
FIGS. 6f–6h plot the rate of heat transfer, heat transfer coefficient, and gas temperature, respectively, as a function of distance from the top of the heat exchanger of FIG. 6e.

A solution, in accordance with preferred embodiments of the present invention, is to vary the heat transfer coefficient to compensate for the change in combustion gas temperature as the gas cools. Therefore, the heat transfer coefficient 2304, plotted in FIG. 6f, preferably increases from a low at the top of the heater head heat exchanger to a maximum at the bottom. This can be accomplished in several ways encompassed by embodiments of the invention as now described.

Figure 6G:
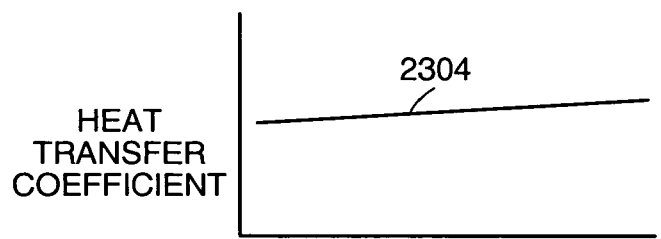
Figure 6H:
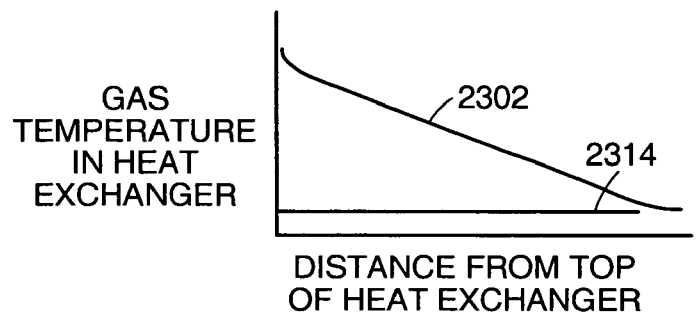
Figure 6E:
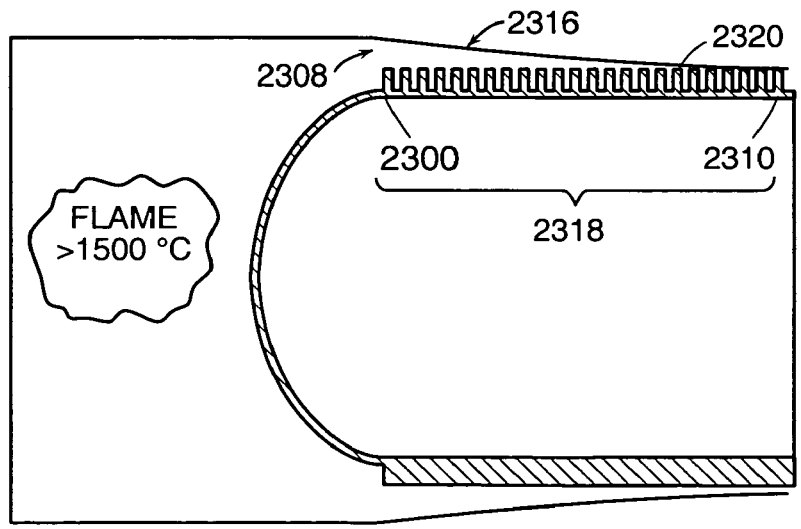
FIG. 6e is a cross sectional side view of a heater head assembly with external heat transfer pin fins shown as well as a pin backer parallel to the wall of the heater head cylinder.

Referring now to FIG. 6h, pin fins 2320 or other heat transfer surfaces in the first embodiment are constant from the top 2300 to the bottom 2310 of the heat exchanger 2318. A "fin backer" 2316 is formed on the outside of the heater head heat exchanger that allows part of the combustion gas 2308 to bypass the top 2300 of the heat exchanger. This uncooled combustion gas then gradually enters the heat exchanger 2318 along its length. Allowing some of the combustion gas to bypass the top end 2300 of the heat exchanger and gradually adding it to the flow of combustion gas past subsequent pin fins evens out the heat transfer 2306 to the head, as plotted in FIG. 6e, for at least two reasons. First, more gas is forced through the lower part of the heat exchanger thereby increase the flow rate toward the bottom 2310 and thus also increasing the coefficient of heat transfer 2304 as plotted in FIG. 6f. Second, fresh hot gas is continuously added to the heat exchanger and thus maintains the combustion gas temperature 2302, as plotted in FIG. 6g, at a higher average temperature relative to the head temperature 2314.

Figure 6I:
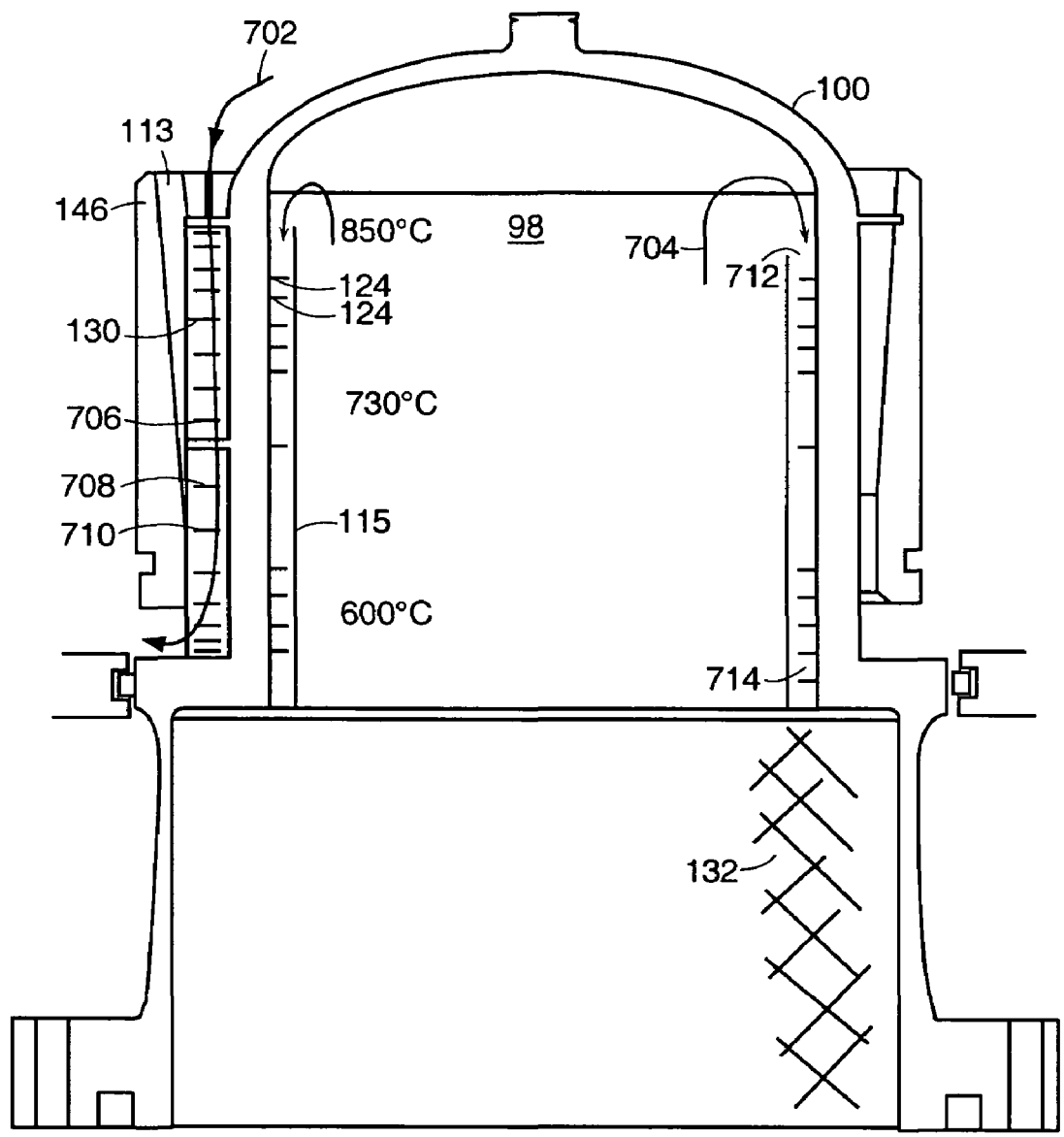
FIG. 6i is a cross sectional side view of the heater head assembly of FIG. 3 (with several heat transfer pins shown schematically for clarity) showing a typical gradient of temperatures as working fluid is driven into the regenerator of a Stirling cycle engine in accordance with an embodiment of the present invention.

In other embodiments, the pin backer may have a constant inside diameter and the pin fin geometry may be varied along the length of the heat exchanger. The heat transfer coefficient will vary from a low at the top of the heat exchanger to maximum at the bottom. This can be accomplished in a number of ways. In one embodiment the density of constant size pin fins increases from a low that the top of the heat exchanger to maximum at the bottom. In another embodiment, the pin height increases from the top to the bottom of the heat exchanger. In another embodiment, spacing between the pins decreases from top to bottom. The ideal dimensions of the pin height, diameter and spacing depend on the particular application. The invention teaches that the heat transfer coefficient is to be increased from top to bottom of the heater head heat exchanger to compensate for the decreasing combustion gas temperature, with the objective being a more constant heat transfer rate along the heater head The mechanical realization of the variable cross-section gas flow channel 113, as described above, is also shown in FIG. 6i. The cross-sectional view of FIG. 6i shows how tapered pin backer 146 allows some of the hottest exhaust gas to bypass the pins near the top of the heater head. Pin backer 146 creates a narrowing annular gap on the outside of the pins that progressively forces more and more of the exhaust gases into the pin heat exchanger. The temperature gradient from the top of the heater to the bottom of the hot section (before regenerator volume 132, shown in FIG. 2)

has been reduced from as much as 350° C. to 100° C. using a variable cross-section gas flow channel.

Figure 7A:
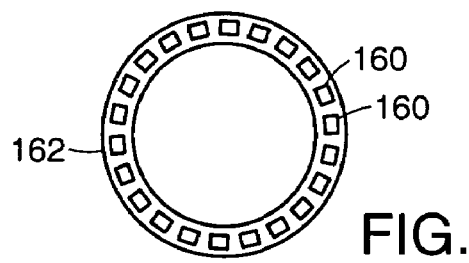
FIGS. 7a–7d depict the application of heat transfer pin rings to provide for thermal transfer between fluids and a heater head in accordance with an embodiment of the present invention.
Figure 7B:
Figure 7C:
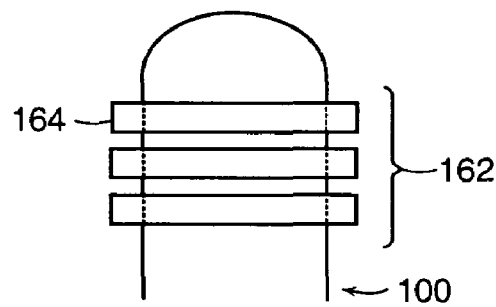
Figure 7D:
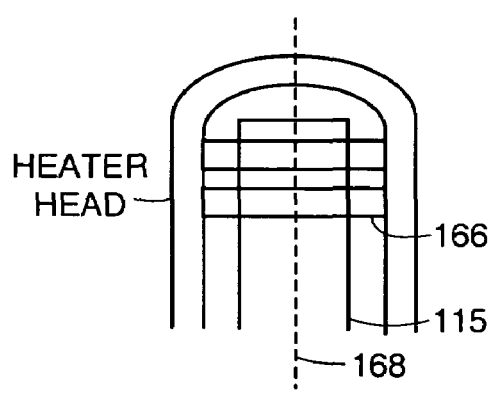

Another method for increasing the surface area of the interface between a solid such as heater head 100 and a fluid such as combustion gases as discussed above is now described with reference to FIGS. 7a–7d. An effect analogous to that of fabricating heat transfer pins by casting or otherwise may be obtained by punching holes 160 into a thin annular ring 162 shown in top view in FIG. 7a and in side view in FIG. 7b. The thickness of ring 162, which may be referred to as a 'heat transfer pin ring' is comparable to the thickness of the heat transfer pins discussed above, and is governed by the strength of the heat-conductive material at the high temperature of the combustion gases traversing holes 160. The shape and disposition of holes 160 within each ring is a matter of design for a particular application, indeed, it is within the scope of the present invention and of any appended claims that holes 160 not be surrounded by solid material. The material of rings 162 is preferably an oxidation-resistant metal such as Inconel 625 or Hastelloy GMR 235, though other heat-conducting materials may be used. Rings 162 may be produced inexpensively by a metal stamping process. Rings 162 are then mounted and brazed, or otherwise bonded, to the outer surface heater head 100, as shown with respect to outer pin rings 164 in FIG. 7c, and with respect to inner pin rings 166 in FIG. 7d. Additional rings may be interspersed between the pin rings to control the vertical spacing between the pins. Expansion cylinder liner 115 is shown in the interior of inner pin rings 166.

Heat transfer rings 162 may be advantageously applied to the interior of the heater head as well as to both the exterior and interior of the cooler of a thermal cycle engine. In these applications, the rings need not be oxidation resistant. Materials including copper and nickel are preferably used on the interior of the heater head, while the rings for the cooler are preferably made of one of various high thermal conductivity materials including aluminum, copper, zinc, etc.

The total cross sectional area of the heat transfer pins taken in a slice perpendicular to cylinder axis 168 need not be constant, indeed, it is advantageously varied, as discussed in detail above, in reference to FIG. 6.

The walls of the heater head must be sufficiently strong, at operating temperatures, to withstand the elevated pressure of the working gas. It is typically desirable to operate Stirling cycle engines at as high a working gas pressure as possible, thus, enabling the head to withstand higher pressures is highly advantageous. In designing the heater head, it must be borne in mind that increasing the pressure at a given operating temperature typically requires increasing the heater head wall thickness in direct proportion. On the other had, thickening the heater head wall results in a longer thermal conduction path between the exterior heat source and the working gas.

Moreover, thermal conduction increases with heat exchanger surface area, thus thermal efficiency is increased by increasing the diameter of the heater head. Stress in the wall, however, is substantially proportional to the diameter of the head, thus increasing the head diameter, at a given temperature and interior gas pressure, requires increasing the wall thickness in direct proportion.

Figure 8A:
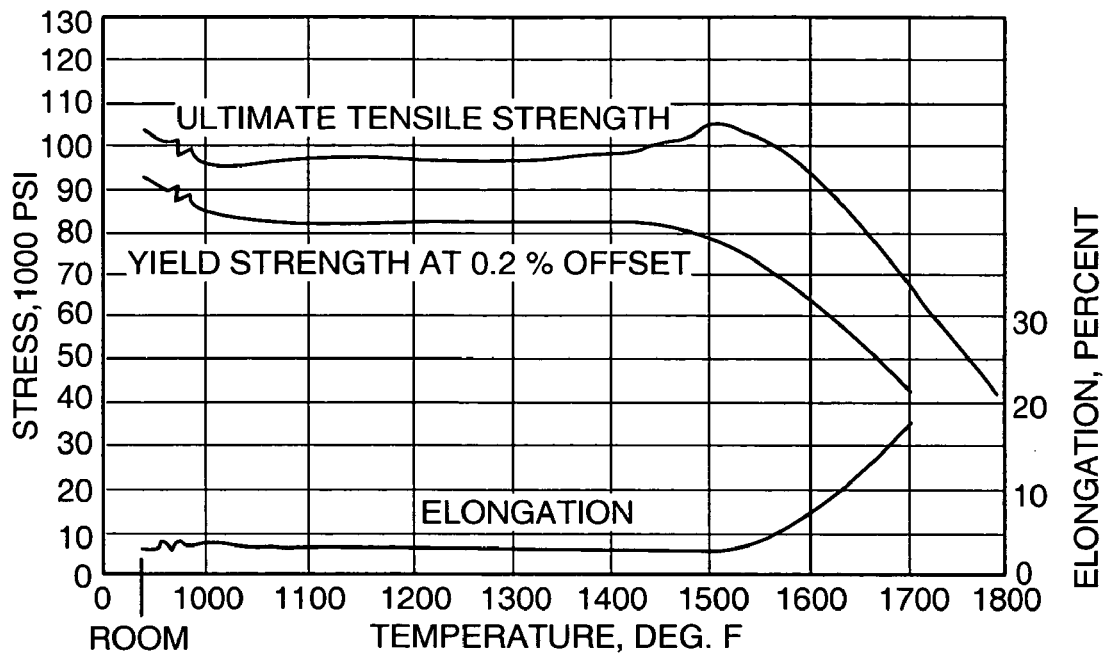
FIG. 8a plots strength curves (left-hand ordinate) and elongation (right-hand ordinate) as a function of temperature for a typical nickel alloy.
Figure 8B:
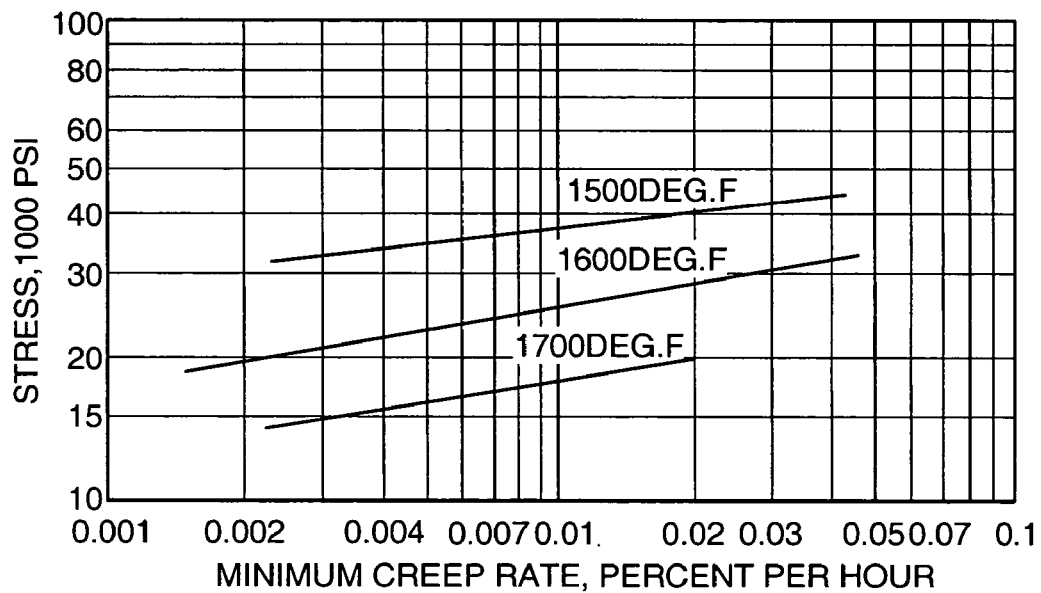
FIG. 8b shows plots of creep rate vs. stress for a typical nickel alloy for three temperatures between 1500° F. and 1700° F.

The strength considerations are tantamount at typical Stirling engine head temperatures, in fact, they drive the maximum operating temperature, since, as discussed, efficiency increases with temperature. Both creep and ultimate tensile strengths of materials tend to fall off precipitously when specified elevated temperatures are reached. Referring to FIG. 8a, the yield strength at 0.2% offset and ultimate tensile strength are shown for the GMR 235 nickel alloy in typical representation of the qualitative behavior of nickel alloys. Similarly, in FIG. 8b, it can be seen that the 0.01% per hour creep rate strength of GMR 235 falls from 40 ksi to half as the temperature rises from 1500° F. to 1700° F.

Figure 9:
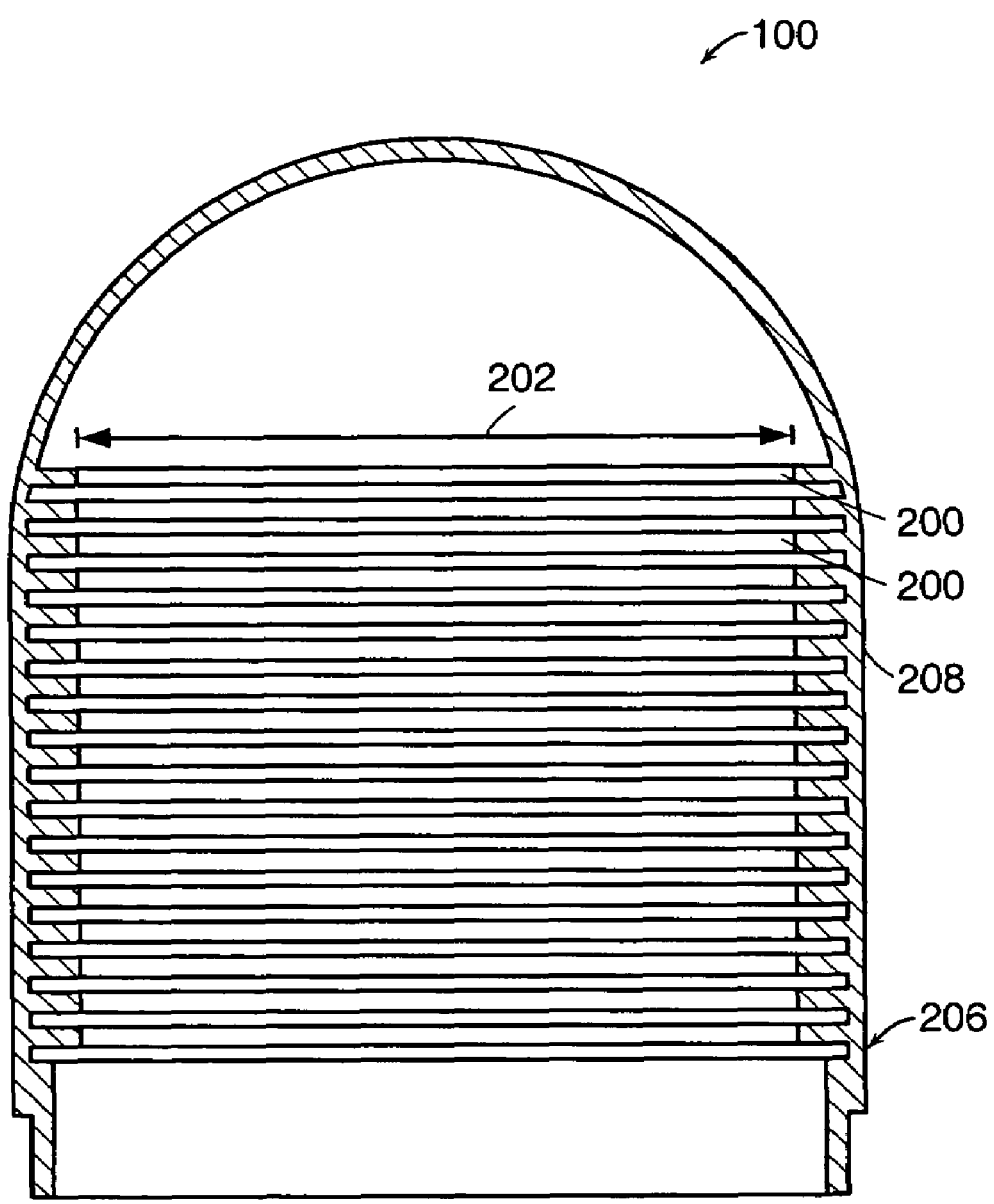
FIG. 9 is a cross-sectional view of a heater head with internal ribbing in accordance with an embodiment of the present invention.
Figure 9:
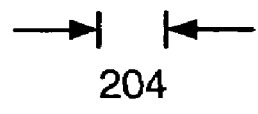

Preferred embodiments of the present invention provide interior ribs (or hoops) 200 that enhance structural support of heater head 100, as shown in cross-section in FIG. 9. Ribs 200 are characterized by an interior bore 202. The creep strength and rupture strength of heater head 100 is thus determined predominantly by an effective thickness 204 of the heater head and the interior bore diameter 202. Heat conduction through the heater head is not limited by thickness 204 since intervening segments 206 of the head are narrower and provide enhanced heat conduction. Ribs 200 not only relieve hoop stresses on outer wall 208 of head 100 but additionally provide supplemental surface area interior to the heater head and thus advantageously enhance heat transfer to the working fluid.

Further advantages of providing ribs 200 interior to the heater head include reducing the temperature gradient across the head wall 208 for a given rate of heat transfer, as well as allowing operation at higher hot end working temperatures. Additionally, by reducing the stress requirements on the outer wall, alternative materials to nickel based superalloys may be used, advantageously providing superior conductivity at reduced cost.

Figure 10:
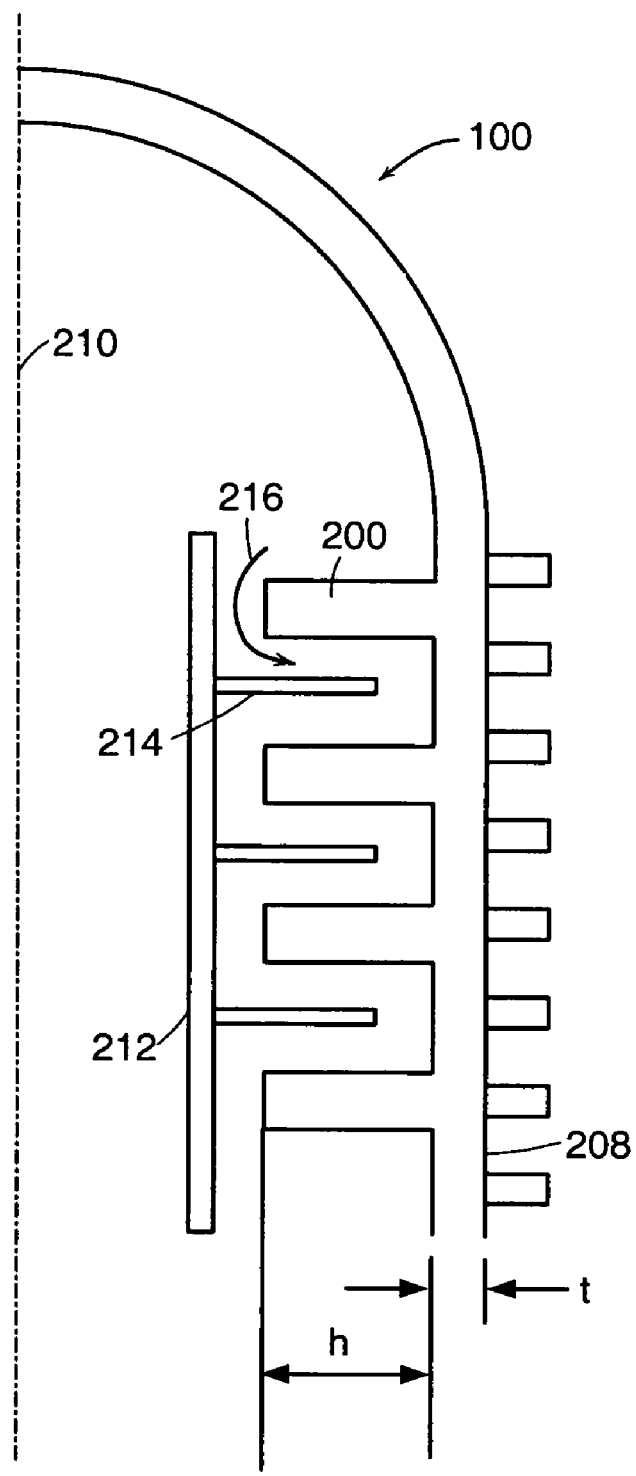
FIG. 10 is a partial cross-section of a heater head having internal ribs, such as shown in FIG. 9, further showing an expansion cylinder hot sleeve with flow diverters in accordance with embodiments of the present invention.

A cross section of heater head 100 with ribs 200 is further shown in FIG. 10. Dashed line 210 designates the central longitudinal axis of the expansion cylinder. In accordance with embodiments of the invention, expansion cylinder hot sleeve 212 may have transverse flow diverters 214 for directing the flow of working gas, represented by around 216, around circumferential ribs 200 for enhancing heat transfer to the working gas. The additional width h of ribs 200 contributes to the hoop strength of heater head 100, whereas heat transfer is governed predominantly by the narrower thickness t of outer heater head wall 208. In typical Stirling engine applications, while the heater head exterior may be run as hot as 1800° F., ribs 200 that provide structure strength typically run no hotter than 1300° F.

Figure 11A:
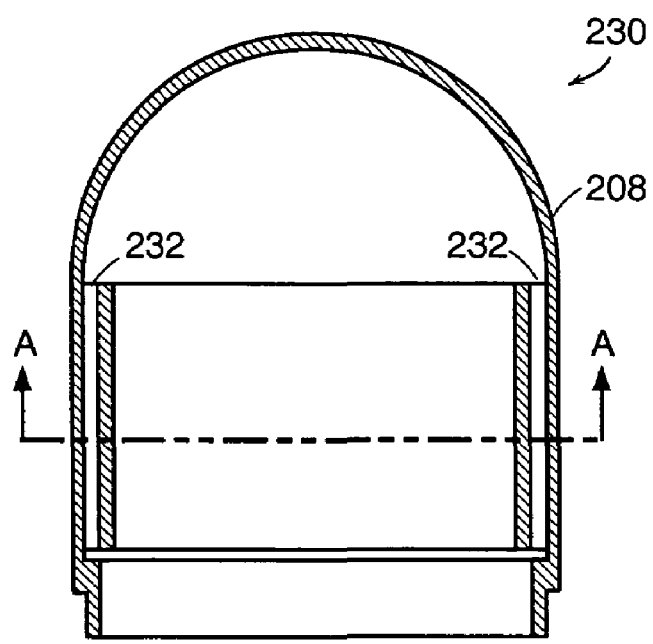
FIGS. 11a and 11b are cross-sectional views of a thermal cycle engine heater head having uninterrupted tubes parallel to the outside walls in accordance with an alternate embodiment of the present invention.
Figure 11B:
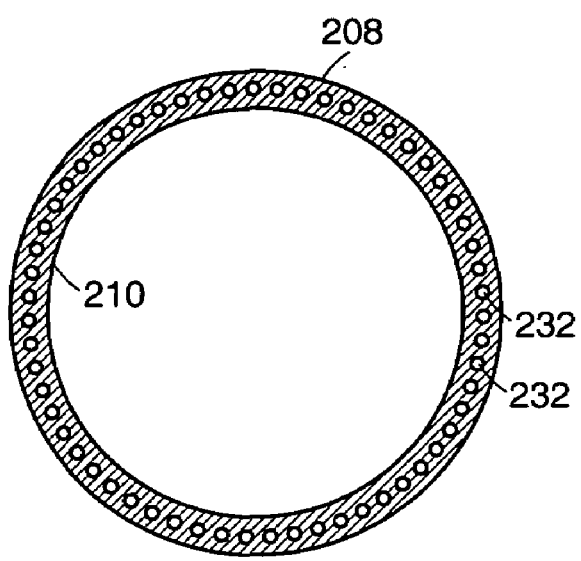

Advantages of enhanced hoop strength concurrent with enhanced thermal conductivity, as discussed above with reference to FIG. 9 may additionally be obtained in accordance with several alternate embodiments. Referring to FIGS. 11a and 11b, cross sections are shown of a heater head 230, wherein tubular openings 232 run parallel to heater head wall 208. As shown in the cross sectional view of FIG. 11b, taken along line AA, tubes 232 allow working gas to pass down the wall, enhancing heat transfer from outside the head to the working gas. Additionally, the wall 208 may be thicker, for the same rate of heat transfer, thus providing additional strength. Moreover, the thick wall section 210 interior to passages 232 remains cooler than would otherwise be the case, providing further additional strength. Heater head 230 is preferably cast with tubular passages 232 which may be round in cross section or of other shapes.

Figure 12A:
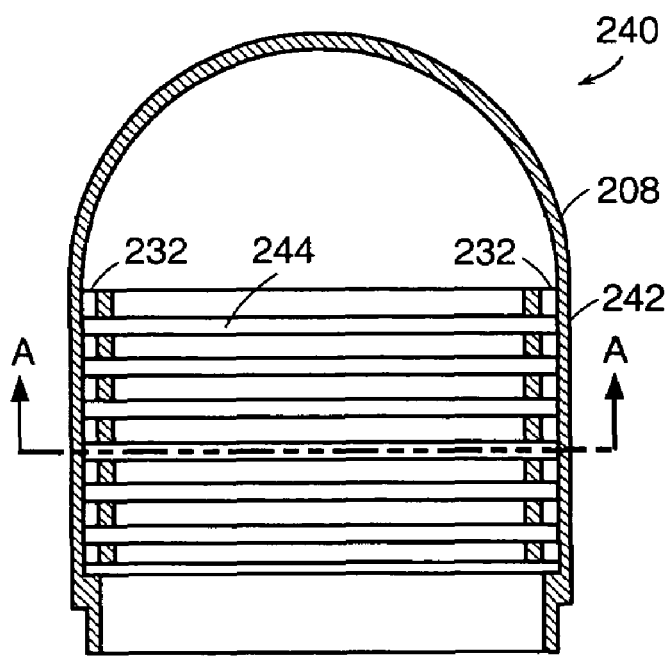
FIGS. 12a and 12b are cross-sectional views of a heater head for a thermal engine having interrupted tubes parallel to the outside walls in accordance with an alternate embodiment of the present invention.
Figure 12B:
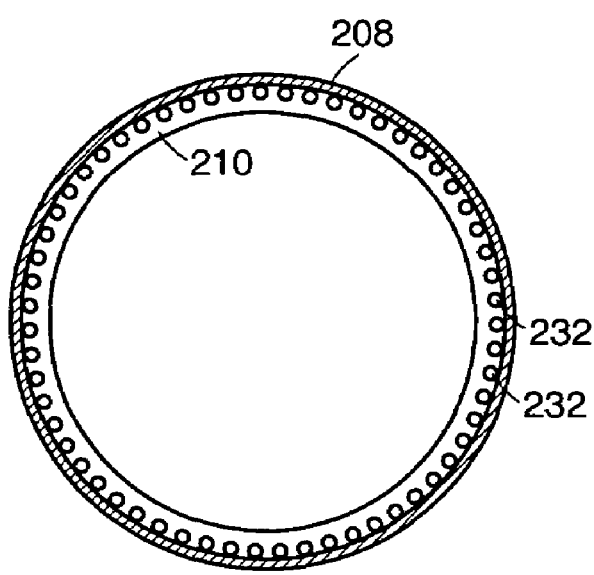

FIG. 12a shows a further heater head 240, in accordance with other embodiments of the invention, wherein tubular openings 232 run parallel to heater head wall 208 and are interrupted by openings that run out to thinner sections 242 of the heater head wall. As shown in the cross sectional view of FIG. 12b, taken along line AA, tubes 232 allow working gas to pass down the wall, enhancing heat transfer from outside the head to the working gas to a degree substantially enhanced over that of the straight tube design shown in FIGS. 11a and 11b. Additionally, openings 244 provide additional area for removal of ceramic cores used in the casting process to create such long, thin holes. Increased access to the holes allows faster chemical leaching of the core in the course of the manufacturing process.

Figure 13A:
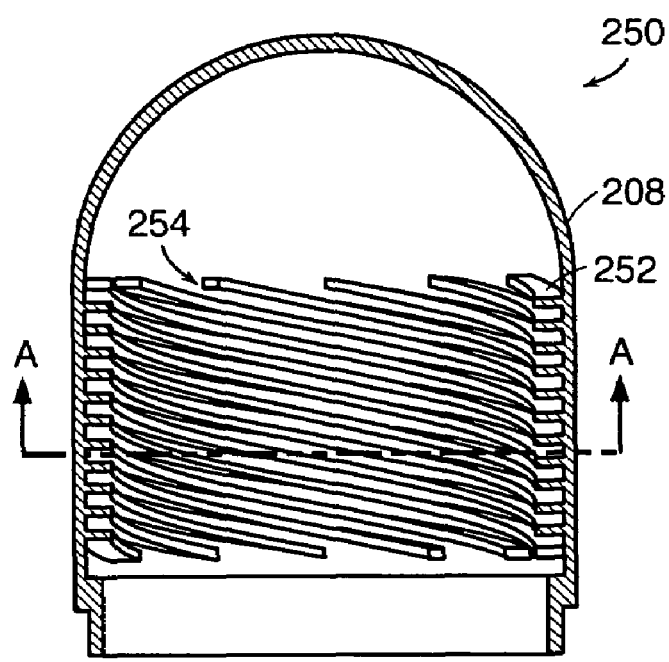
FIGS. 13a and 13b are cross-sectional views of a heater head for a thermal engine having helical fins along the interior of the outside walls in accordance with an alternate embodiment of the present invention.
Figure 13B:
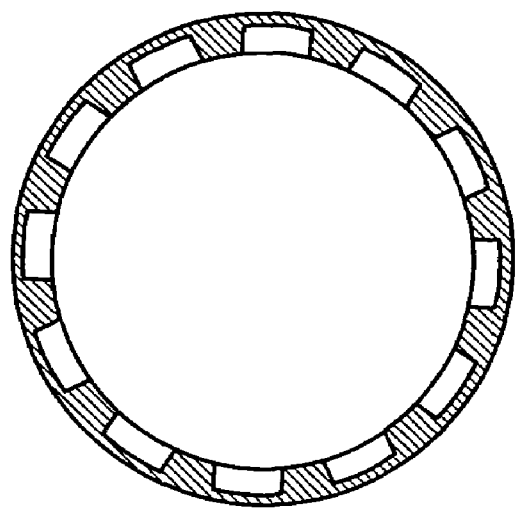

FIG. 13b shows yet another heater head 250, wherein ribs 252 are disposed in a helix within heater head wall 208, thereby providing the wall with enhanced rigidity in both the circumferential and axial directions. The working gas flows through the spiral 254 on a path between the expansion piston and the heater head, on its way to the regenerator. FIG. 13b shows a transverse cross section of the heater head of FIG. 13a taken along line AA. It is also within the scope of the invention to employ a linear, or other, approximation to spiral 254, to obtain comparable advantages of stiffening and heat transfer.

Figure 14A:
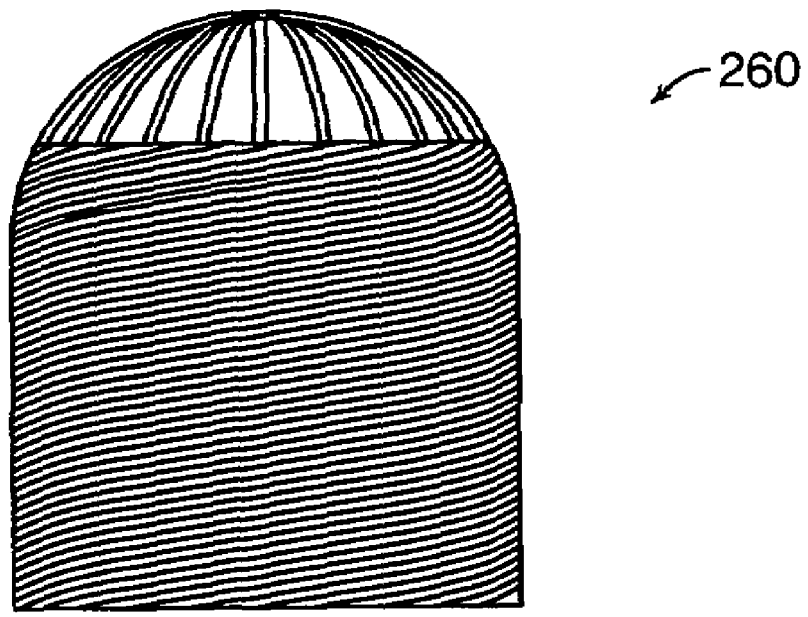
FIG. 14a is a side view of a core assembly for casting a heater head for a thermal engine having helical fins along the interior of the outside walls and a ribbed dome in accordance with an alternate embodiment of the present invention.
Figure 14B:
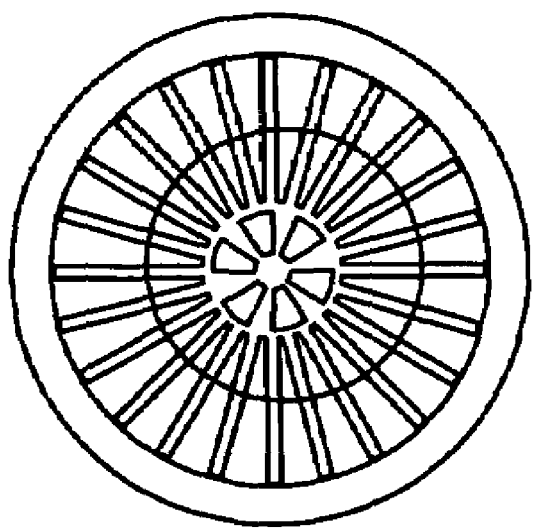
FIG. 14b is a cross section, viewed downward transverse to the central axis, of the ribbed dome of a core assembly as shown in FIG. 14a for casting a heater head in accordance with an alternate embodiment of the present invention.
Figure 15:
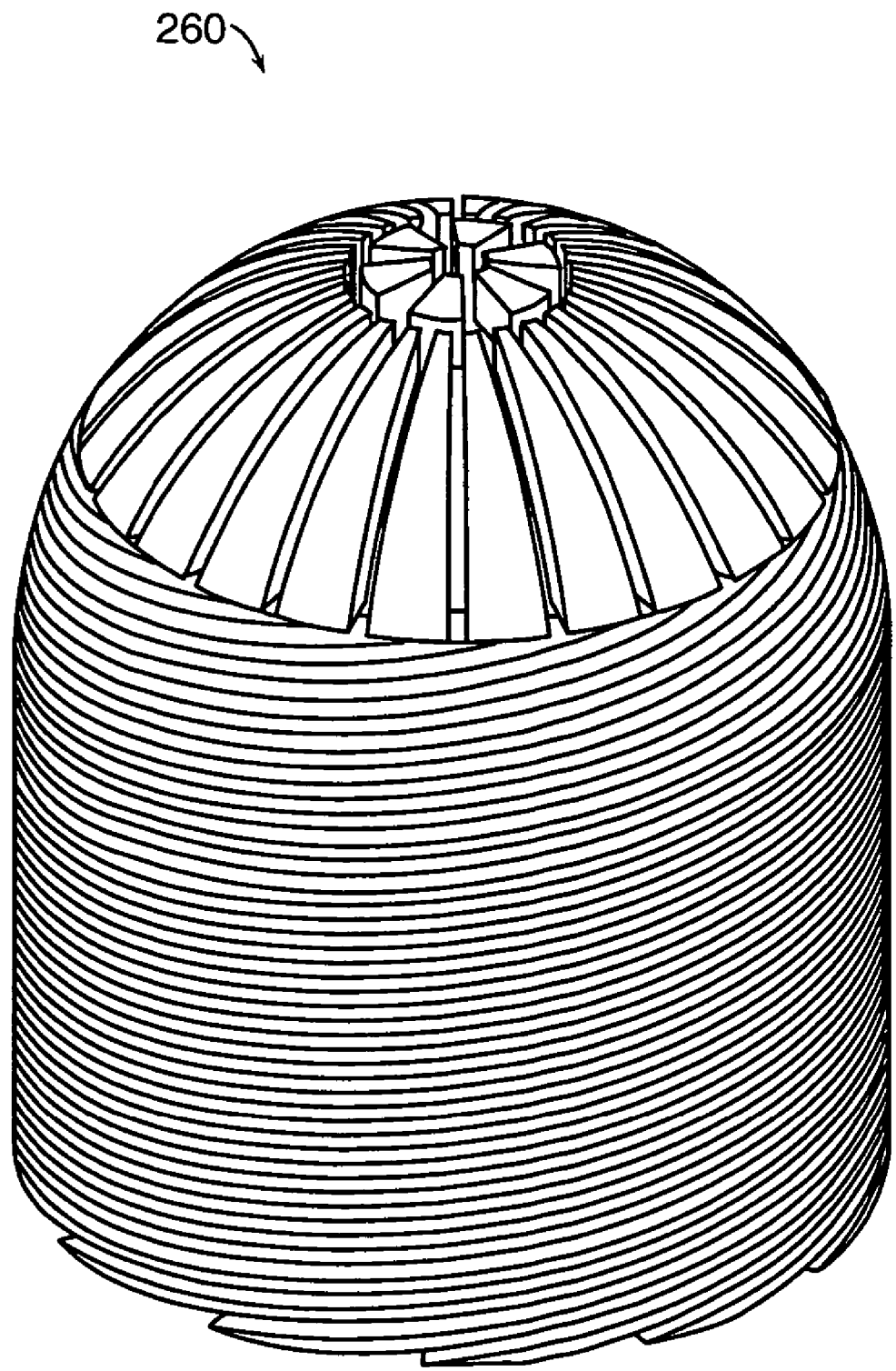
FIG. 15 is a perspective view of the core assembly of FIG. 14a assembly for casting a heater head for a thermal engine having helical fins along the interior of the outside walls and a ribbed dome in accordance with an alternate embodiment of the present invention.

Heater head 250 of FIGS. 13a and 13b is preferably fabricated by casting. A side view of core assembly 260 for use in the casting process is shown in FIG. 14a. It is additionally advantageous to provide ribs for internal support of the dome of the heater head and to provide additional heat exchange on the dome, thereby cooling the inner surface of the dome. The complementary core structure of the dome is shown in FIG. 14b, and, in cross section, as viewed from the top, in FIG. 14b. A perspective view of core assembly 260 is shown in FIG. 15.

The devices and methods described herein may be applied in other applications besides the Stirling engine in terms of which the invention has been described. The described embodiments of the invention are intended to be merely exemplary and numerous variations and modifications will be apparent to those skilled in the art. All such variations and modifications are intended to be within the scope of the present invention as defined in the appended claims.

We claim:

1. In a thermal cycle engine of the type having a piston undergoing reciprocating linear motion within an expansion cylinder, the expansion cylinder having a cylindrical wall and containing a working fluid heated by conduction through a heater head of heat from an external thermal source, the conduction characterized by a heat transfer coefficient, the improvement comprising:
   a. a heat exchanger for transferring thermal energy across the heater head from a heated external fluid to the working fluid, the heat exchanger comprising a set of heat transfer protuberances, each heat transfer protuberance having an axis directed substantially away from the cylindrical wall of the expansion cylinder; and
   b. means for increasing the heat transfer coefficient in a direction of flow of the heated external fluid.

2. A heat exchanger for transferring thermal energy from a heated external fluid across a cylindrical wall, the cylindrical wall characterized by a length direction parallel to a central axis of the cylindrical wall, the heat exchanger comprising:
   a. a set of staggered heat transfer protuberances, each heat transfer protuberance having an axis directed substantially away from the cylindrical wall;
   b. a plurality of dividers disposed substantially along the length of the cylindrical wall, for forcing fluid flow through the staggered heat transfer protuberances.

3. A heat exchanger for transferring thermal energy from a heated external fluid across a cylindrical wall characterized by an axial direction, the heat exchanger comprising:
   a. a set of heat transfer protuberances, each heat transfer protuberance having an axis directed substantially away from the cylindrical wall; and
   b. a backer for guiding the heated external fluid in a flow path substantially along the axial direction of the cylindrical wall past the set of heat transfer protuberances, wherein the spacing between the cylindrical wall and the backer varies.

4. A heat exchanger for transferring thermal energy from a heated external fluid across a cylindrical wall characterized by an axial direction, the heat exchanger comprising:
   a. a set of heat transfer protuberances, each heat transfer protuberance having an axis directed substantially away from the cylindrical wall; and
   b. a backer for guiding the heated external fluid in a flow path substantially along the axial direction of the cylindrical wall past the set of heat transfer protuberances, wherein a gap between the backer and the cylindrical wall decreases in the axial direction.

5. A heat exchanger for transferring thermal energy from a heated external fluid across a cylindrical wall characterized by an axial direction, the heat exchanger comprising:
   a. a set of heat transfer protuberances, each heat transfer protuberance having an axis directed substantially away from the cylindrical wall; and
   b. a backer for guiding the heated external fluid in a flow path substantially along the axial direction of the cylindrical wall past the set of heat transfer protuberances, wherein the heat transfer protuberances have a surface area transverse to the flow path that increases in the axial direction.

6. A heat exchanger for transferring thermal energy from a heated external fluid across a cylindrical wall characterized by an axial direction, the heat exchanger comprising:
   a. a set of heat transfer protuberances, each heat transfer protuberance having an axis directed substantially away from the cylindrical wall; and
   b. a backer for guiding the heated external fluid in a flow path substantially along the axial direction of the cylindrical wall past the set of heat transfer protuberances, wherein the heat transfer pins have a population density that increases in the axial direction.

7. A heat exchanger for transferring thermal energy from a heated external fluid across a cylindrical wall characterized by an axial direction, the heat exchanger comprising:
   a. a set of heat transfer protuberances, each heat transfer protuberance having an axis directed substantially away from the cylindrical wall; and
   b. a backer for guiding the heated external fluid in a flow path substantially along the axial direction of the cylindrical wall past the set of heat transfer protuberances, wherein at least one of the height and density of the heat transfer pins varies with distance in the axial direction.

* * * * *